(12) United States Patent
Howe et al.

(10) Patent No.: US 8,815,138 B2
(45) Date of Patent: Aug. 26, 2014

(54) METHOD OF PRODUCING A RECOIL PAD FOR A WEAPON

(75) Inventors: Phillip D. Howe, Fort Collins, CO (US); Richard A. Moore, Fort Collins, CO (US); Richard K. Herndon, Fort Collins, CO (US)

(73) Assignee: North Pass, Ltd., Fort Collins, CO (US)

( * ) Notice: Subject to any disclaimer, the term of this patent is extended or adjusted under 35 U.S.C. 154(b) by 73 days.

(21) Appl. No.: 13/340,202

(22) Filed: Dec. 29, 2011

(65) Prior Publication Data

US 2012/0167432 A1 Jul. 5, 2012

Related U.S. Application Data

(60) Provisional application No. 61/460,338, filed on Dec. 31, 2010.

(51) Int. Cl.
*B29C 39/10* (2006.01)

(52) U.S. Cl.
USPC .......................................... 264/275; 264/278

(58) Field of Classification Search
None
See application file for complete search history.

(56) References Cited

U.S. PATENT DOCUMENTS

| | | | | | |
|---|---|---|---|---|---|
| 1,842,528 | A | * | 1/1932 | Knight | 42/74 |
| 1,861,234 | A | * | 5/1932 | Knight | 42/74 |
| 3,135,064 | A | * | 6/1964 | Pachmayr | 42/74 |
| 3,263,359 | A | * | 8/1966 | Pachmayr | 42/74 |
| 3,609,903 | A | * | 10/1971 | Pachmayr | 42/74 |
| 4,956,932 | A | * | 9/1990 | Cupp | 42/74 |
| 5,814,254 | A | * | 9/1998 | Bisconti | 264/46.4 |
| 7,121,032 | B2 | * | 10/2006 | Daul et al. | 42/1.06 |
| 2003/0020202 | A1 | * | 1/2003 | Ueno et al. | 264/163 |
| 2004/0144011 | A1 | * | 7/2004 | Vignaroli et al. | 42/74 |

OTHER PUBLICATIONS

U.S. Appl. No. 61/460,338, filed Dec. 31, 2010.

* cited by examiner

*Primary Examiner* — Edmund H. Lee
(74) *Attorney, Agent, or Firm* — Craig R. Miles; CR Miles, P.C.

(57) ABSTRACT

A recoil pad having a pad in which the elastomer contains a plurality of pockets having one or more pocket characteristics adjustable over the entirety or portions of the pad to achieve recoil pad characteristics which can be incrementally variably matched to the recoil energy characteristics and recoil energy transfer characteristics of a particular target stock.

10 Claims, 6 Drawing Sheets

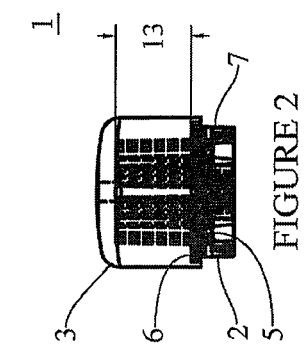
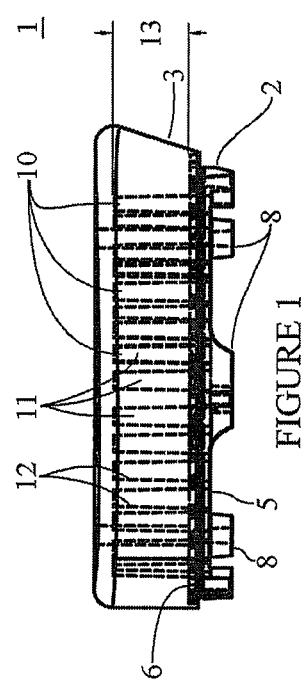
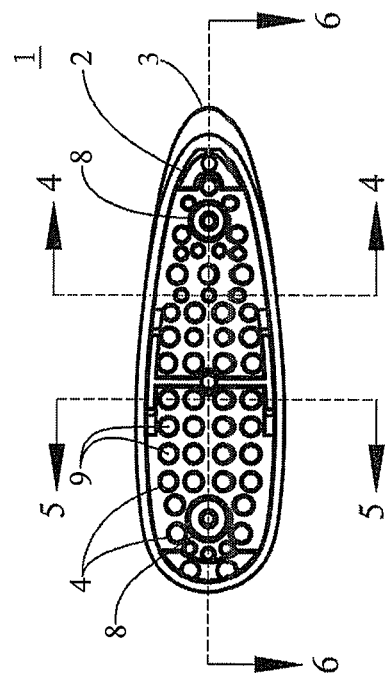

METHOD OF PRODUCING A RECOIL PAD FOR A WEAPON

This United States Non-Provisional Patent Application claims the benefit of U.S. Provisional Patent Application No. 61/460,338, filed Dec. 31, 2010, hereby incorporated by reference herein.

I. FIELD OF THE INVENTION

A recoil pad having a pad in which the elastomer contains a plurality of pockets having one or more pocket characteristics adjustable over the entirety or portions of the pad to achieve recoil pad characteristics which can be incrementally variably matched to the recoil energy characteristics and recoil energy transfer characteristics of a particular target stock.

II. BACKGROUND OF THE INVENTION

Conventional recoil pads generally fall into three categories.

Pre-fit recoil pads generally provide a rigid base coupled to an elastomer pad. The rigid base has a configuration which mates to a particular configuration of synthetic target stock. For each different configuration of synthetic target stock there can be a correspondingly differently configured rigid base.

Grindable recoil pads generally provide a rigid base coupled to an elastomer pad. The material from which the rigid base and from which the elastomer pad are formed can be joined, coupled to the target stock and reconfigured as an integral unit with the stock by removal of an amount of material sufficient to make flush the external surfaces of the stock and the recoil pad. Accordingly, a grindable recoil pad can be fitted to numerous and varied configurations of target stocks.

Slip-on recoil pads typically do not provide a rigid base to affix the recoil pad to the target stock. Rather, the rigid base is replaced by a sleeve which slidly overlays a sufficient portion of the external surface of the target stock to remain in fixed relation. The sleeve and the pad can be formed from an elastomer as a single piece within a mold and can be utilized with target stocks produced from both natural and synthetic materials.

With respect to each of the above-described categories of conventional recoil pads, the conventional elastomer pad may function to absorb recoil energy or delay the transfer of recoil energy from the stock to the shooter (also referred to as "recoil pad characteristics"), or both in a fixed relation depending upon the structure of the pad (both external structure and internal structure)(also referred to as "recoil pad structure") and elastomer characteristics under service conditions such as hardness, flexure, compression, or the like (also referred to as "elastomer characteristics"). While there are a numerous and wide variety of conventional recoil pads in each of the above-described categories, there remain substantial unresolved problems.

One substantial problem with conventional recoil pads can be that the pad is a solid elastomer pad having a fixed homogeneous recoil pad structure and elastomer characteristics throughout the recoil pad. A solid elastomer recoil pad in the first instance can add unwanted weight to the recoil pad. Additionally, the only ways to adjust recoil pad characteristics of a solid recoil pad may be to adjust the external recoil pad structure or adjust the elastomer characteristics in production of the recoil pad.

Another substantial problem with conventional recoil pads can be that the number and structure of the air spaces internal to a particular recoil pad may be limited resulting in a corresponding limitation as to incremental variation within a graded series of recoil pads as to response in the absorption of recoil energy and response in delay transfer of recoil energy, or both in various permutations and combinations.

Another substantial problem with conventional recoil pads can be that the mold into which the elastomer may be molded to produce a conventional recoil pad may have an invariable mold structure that cannot be altered to provide a lesser or greater amount of air space as to particular regions or as to substantially the entirety of the internal recoil pad structure whether independent of or in relation to the external recoil pad structure or as to elastomer characteristics, or both, to correspondingly alter absorption of recoil energy or to delay transfer of recoil energy, or both in various permutations and combinations, from the target stock to the shooter. Therefore, the same configuration of recoil pad may be used between target stocks having similar structure for absorption of recoil energy and to delay transfer of recoil energy which between target stocks can have substantially different recoil energy characteristics. Alternately, a plurality of different molds can be made for each of a corresponding number of different recoil pads to address the different characteristics of recoil energy from different target stocks.

III. SUMMARY OF THE INVENTION

Accordingly, a broad object of the invention can be to provide a method for producing selectable incrementally variable compression, hardness, or stiffness characteristic in an elastomer for use in recoil pads common to a numerous and wide variety of target stocks and recoil energy characteristics.

Another broad object of the invention can be to provide a recoil pad or a graded series of recoil pads having a pad in which the elastomer contains a plurality of pockets adjusted in volume and configuration over the entire pad or portions of the pad to achieve compressibility, hardness or stiffness characteristics which can be incrementally matched to the recoil energy characteristics and recoil energy transfer characteristics of a particular target stock or family of target stocks.

Naturally, further objects of the invention are disclosed throughout other areas of the specification, drawings, photographs, and claims.

IV. BRIEF DESCRIPTION OF THE DRAWINGS

FIG. 1 is a side view of a particular embodiment of the inventive recoil pad.

FIG. 2 is an end view of the particular embodiment of the inventive recoil pad shown in FIG. 1.

FIG. 3 is bottom view of the particular embodiment of the inventive recoil pad shown in FIG. 1.

V. DETAILED DESCRIPTION OF THE INVENTION

Figure 6:
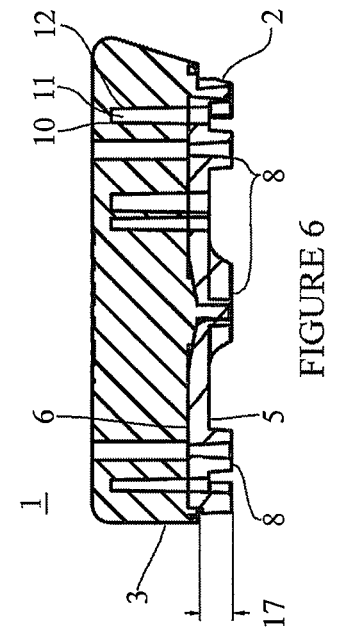
FIG. 6 is a cross section view 6-6 of the particular embodiment of the inventive recoil pad shown in FIG. 1.

Now referring primarily to FIGS. 1-6, which show a pre-fit embodiment of the inventive recoil pad (1) which includes an inventive base (2) and an inventive pad (3). The base (2) can be formed, molded, fabricated or the like from a variety of materials having sufficient strength to be joined to a target stock (by adhesive, mechanical fasteners, or otherwise) and used for the purpose of supporting an over-mold pad (3) during use of a weapon. Typically, the weapon will be a rifle or shotgun; however, the invention is not so limited, and the inventive pre-fit recoil pad or other recoil pads described herein can be used to absorb recoil energy or delay transfer of recoil energy, or both, in various relations depending upon the recoil pad structure and the elastomer characteristics, from any type of weapon regardless of the use, such as military weapons, sport weapons, or the like.

Typically, the base (2) will be produced from a plastic material using injection molding techniques; however, the invention is not so limited, and the base (2) can be produced from a variety of materials including metal, wood, carbon fiber, or the like, depending on the application. The base (2) can further include a plurality of aperture elements (4)(and while only several are identified by numerical identifier in the Figures several dozen aperture elements (4) or more may be included in a particular embodiment of the base (2)). Each of the plurality of aperture elements (4) communicate between a front surface (5) of the base (2) joinable to the target stock and a back surface (6) of the base (2) which receives or couples to the over-mold pad (3). The front surface (5) and the back surface (6) can be generally flat and disposed a distance apart (which can be in generally parallel opposed relation) with the thickness defining the height (17) (see FIG. 6) of a side (7) of the base (2). The side (7) of the base (2) having a perimeter configuration which substantially matches the configuration of the target stock to which the base (2) joins to provide a substantially flush surface between the target stock surface and the side (7) of the base (2). Understandably, depending on the application, the base (2) can have a greater or lesser thickness. The base (2) can further include one or more mount elements (8) which extend outwardly from the front surface (5) of the base (2) to matingly engage with one or more corresponding target stock mount elements. The one or more mount elements (8) coupled with the target stock mount elements can function to align the base (2) with the target stock to provide the above-described substantially flush surface between the surface of the target stock and the side (7) of the base (2) and to provide structural integrity to synthetic target stocks which may be hollow.

Now referring primarily to FIG. 3, the plurality of aperture elements (4) while shown as generally circular in configuration can be configured to provide any of wide variety of geometries such as oval, square, rectangular, triangular, or the like, depending on the application. The open area (9) defined by each of the plurality of aperture elements (4) can be varied from one embodiment to another. While the numerosity of the plurality of aperture elements (4) between embodiments of the base (2) can vary due to the area bounded by the perimeter of the base (2) and the open space (9) of the plurality of aperture elements (4), typically, the plurality of aperture elements (4) can be sufficiently numerous to substantially infill the area of the base defined by the perimeter. Typically, an embodiment of the base (2) will include several dozen aperture elements (4) which can vary as to the amount open space (9).

Figure 7:
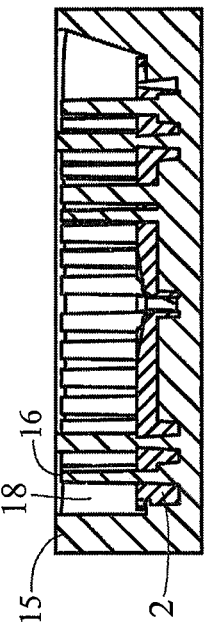
FIG. 7 is a cross section view of a mold used in the production of a plurality of embodiments of the inventive recoil pad of FIGS. 1-6.
Figure 5:
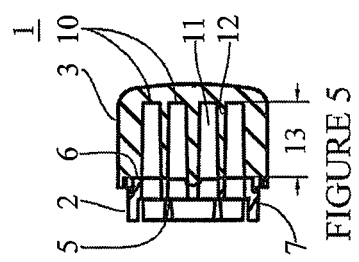
FIG. 5 is a cross section view 5-5 of the particular embodiment of the inventive recoil pad shown in FIG. 1.
Figure 4:
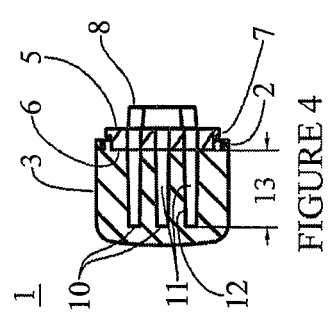
FIG. 4 is a cross section view 4-4 of the particular embodiment of the inventive recoil pad shown in FIG. 1.
Figure 9:
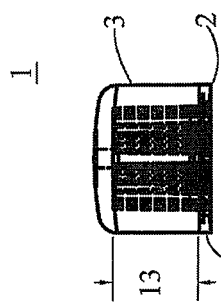
FIG. 9 is an end view of the particular embodiment of the inventive recoil pad shown in FIG. 8.
Figure 8:
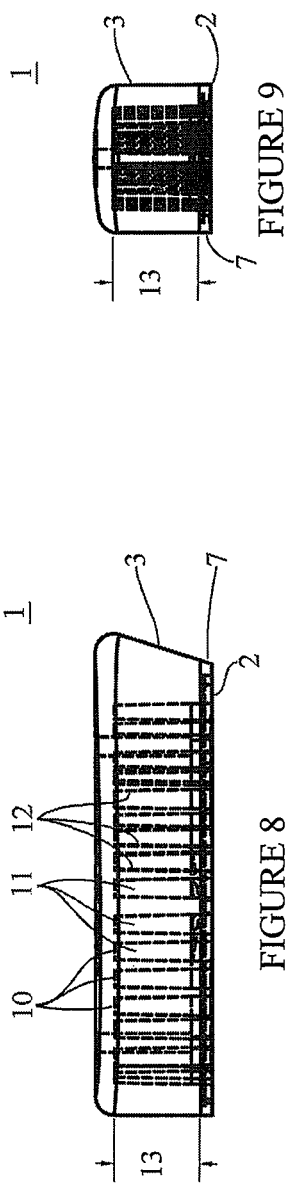
FIG. 8 is a side view of another particular embodiment of the inventive recoil pad.
Figure 10:
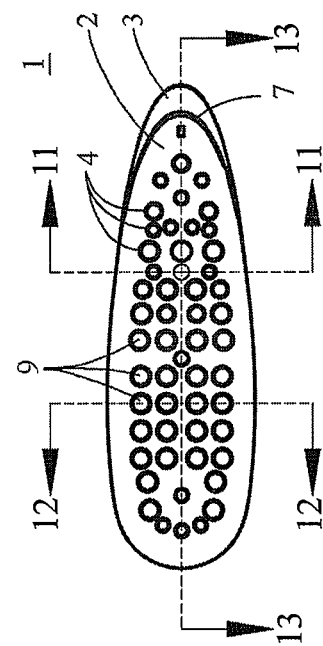
FIG. 10 is a bottom view of the particular embodiment of the inventive recoil pad shown in FIG. 8.
Figure 13:
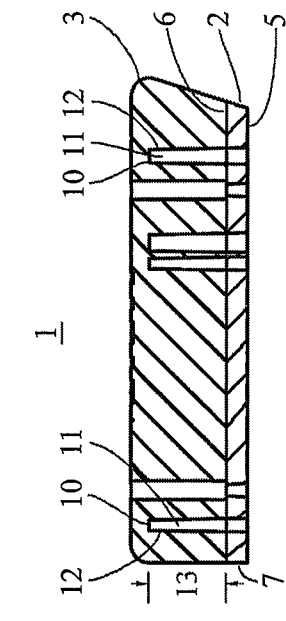
FIG. 13 is a cross section view 13-13 of the particular embodiment of the inventive recoil pad shown in FIG. 8.
Figure 14:
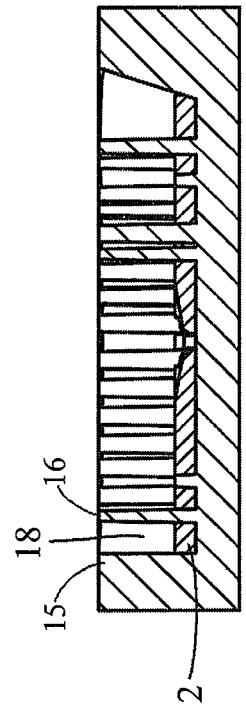
FIG. 14 is a cross section view of a mold used in the production of a plurality of embodiments of the inventive recoil pad of FIGS. 8-13.
Figure 12:
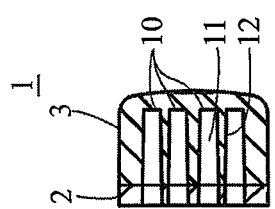
FIG. 12 is a cross section view 12-12 of the particular embodiment of the inventive recoil pad shown in FIG. 8.
Figure 11:
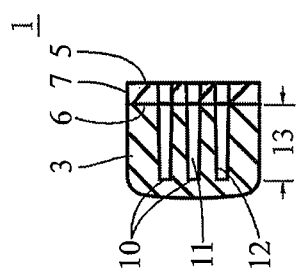
FIG. 11 is a cross section view 11-11 of the particular embodiment of the inventive recoil pad shown in FIG. 8.
Figure 16:
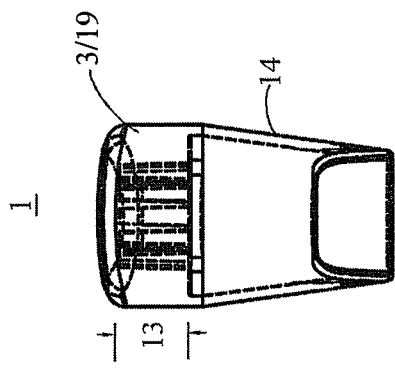
FIG. 16 is an end view of the particular embodiment of the inventive recoil pad shown in FIG. 15.
Figure 15:
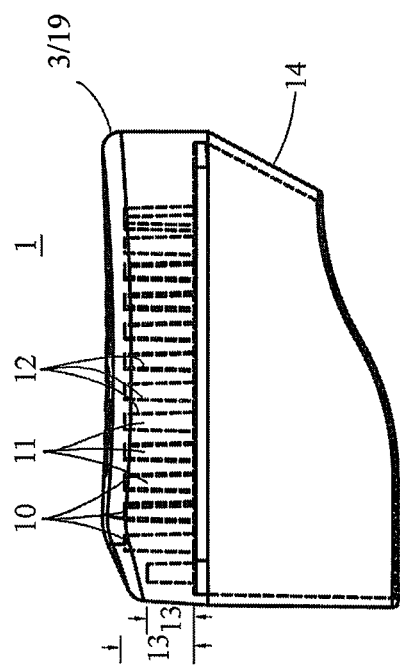
FIG. 15 is a side view of another particular embodiment of the inventive recoil pad.
Figure 17:
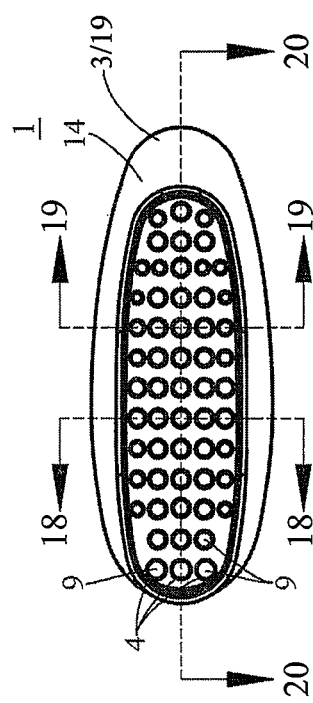
FIG. 17 is a bottom view of the particular embodiment of the inventive recoil pad shown in FIG. 15.

The base (2) can be introduced into or received by a mold cavity (18) of a mold (15) (such as an injection mold as shown in part in FIG. 7) having one or more core pins (16). Each of the core pins (16) can correspondingly pass through one of the plurality of aperture elements (4) in the base (2). One or more of the core pins (16) can function to secure the base (2) at a location in the mold (15). An amount of thermoplastic elastomer (19) can be introduced into the mold (15). The amount of thermoplastic elastomer (19) introduced into the mold can be sufficient to over-mold the entire back surface (6) of base (2) and fill the mold (15) to produce the intended configuration of the pad (3). The thermoplastic elastomer (19) cured in contact with or overmolded to the back surface (6) of the base (2) secures or joins the pad (3) to the back surface (6) of the base (2) to provide a one piece pre-fit recoil pad (1).

Now referring primarily to FIGS. 1-7, the mold (15) can further provide one or more core pins (16) which correspondingly pass through one or more of the aperture elements (4) and extend outwardly a distance (13) from the back side (6) of the base (2) into the inside volume of the mold cavity (18) such that the thermoplastic elastomer (19) introduced into the mold cavity (18) forms about each of the one or more core pins (16) within the mold cavity (18). Accordingly, upon curing of the elastomer (19) and removal of the pre-fit recoil pad (1) from the mold cavity (18), the pad (3) can have within one or more pockets (10) each having a pocket volume (11) and an internal pocket surface (12) corresponding substantially to the volume and the configuration of the core pins (16) removed from the pocket (10)(as shown in the example of FIG. 1).

As to any particular recoil pad (1) the one or more pockets (10) can each have a one or more pocket characteristics varied by corresponding adjustment of one or more core pin characteristics with in the mold cavity (18) prior to introducing the elastomer (19) into the mold cavity (18). The one or more core pin characteristics which can be adjusted in various combination and permutations can include the numerosity of the core pins (16) which pass through a corresponding numerosity of aperture elements (4) in the base (2). Numerosity of core pins (16) can be adjusted by adding to or removing from the mold cavity (18) one or more core pins (16) thereby having to pass a lesser or greater plurality of core pins (16) through a corresponding lesser or greater plurality of aperture elements (4) of the base (2) to extend outwardly a distance (13) from the back side (6) of the base (2) into the inside volume of the mold cavity (18). Additionally, the one or more core pin characteristics can include location of each of a plurality of core pins (16) which can be adjusted in the mold cavity (18) and can pass through a correspondingly located plurality of apertures (4) in the base (2). Additionally, the one or more core pin characteristics can include a pattern of core pins (16) which can be achieved by locating a plurality of core pins (16) in the mold cavity (18) in a pre-determined spatial relationship to correspondingly pass through the same pattern of the plurality of apertures (4) in the base (2). Moreover, the one or more core pin characteristics can include the cross sectional area of one or more core pins (16) which can be matched with the corresponding open space (9) of a plurality of apertures (4). Additionally, the one or more core pin characteristics can include the height of one or more core pins which can be adjusted in the mold cavity (18) in relation to said back surface of said base (2). Understandably, the height among a plurality of core pins (16) within the mold cavity (18) can vary.

Curing an amount of elastomer (19) within the mold cavity (18) to overmold the back surface (6) of the base (2) provides a pad (3) having within one or more pockets (10) having one or more pocket characteristics generated by adjustment of the one or more core pin characteristics within said mold cavity (18). Understandably, the pocket characteristics include numerosity, pattern, cross sectional area, difference in cross sectional area, height, difference in height, or the like all variably achievable to produce a wide variety of different pad structures by adjustment of the one or more core pin characteristics, as above-described.

Accordingly, the pocket volume (11) of a particular pocket (10) can be adjusted by altering the distance (13) that the corresponding mold pin (16) extends from the back surface (6) of the base (2) into the inside volume of the mold. The greater the distance (13) that the mold pin extends into the inside volume of the mold (15), the greater the corresponding pocket volume (11) of a particular pocket (10). The pocket volume (11) of a particular pocket (10) can also be adjusted by the use of a mold pin (16) having a greater or lesser volume. As one non-limiting example, the mold pin (16) can have a greater or lesser cross-section area which passes through the corresponding greater or lesser open area (9) of a particular aperture element (4). The lesser the cross-sectional area of the mold pin (16), the lesser the pocket volume (11) of the corresponding pocket (10) per unit distance (13) extending from the back surface (6) of the base (2). Additionally, if the external surface of the mold pin (16) has a particular configuration the internal pocket surface (12) can have a corresponding configuration which can provide a lesser or greater pocket volume (11). The total pocket volume (11) of the entirety or a region of a particular pad (3) can be variably adjusted by utilizing a greater or lesser number of core pins (16), altering the configuration of one or more core pins (16), or the adjusting the distance (13) to which one or more core pins (16) extend beyond the back surface (6) of the base (2).

The above described structure of the mold (15) and method of using the mold (15) allows use of one mold for production of a numerous and wide variety of different pads (3) which can differ in regard to internal recoil pad structure or which can differ in regard to elastomer characteristics, or both in various permutations or combinations, which allow for a correspondingly wide range of recoil pad characteristics for absorbing recoil energy or to delay the transfer of recoil energy from the stock to the shooter.

In structuring a particular embodiment of the base (2) for corresponding use with a particular embodiment of the mold (15), the plurality of apertures (4) in the base (2) can be defined over the entirety of the base (2) or as to a particular region of the base (2) in regard to the number of the plurality of apertures (4), the pattern of the plurality of apertures (4), the open area of the plurality of the apertures (4). the variation in open area (9) among the plurality of apertures (4), the spacing between the plurality of apertures (4) all or each of which can be coordinated with the structure of the core pins (16) as to cross sectional configuration, cross sectional area and core pin length all or each of which can be further coordinated with elastomer characteristics such as hardness, stiffness, flexure, compression, to provide a particular embodiment of the a base (2) and the corresponding mold (15) useful with the corresponding embodiment of the method generally described above which allows production of a graded series of pads (3) having fine incremental adjusted variation to correspondingly alter recoil energy characteristics transferred to the shooter and without limitation to the forgoing by absorbing recoil energy or the delay in transferring recoil energy to the shooter, or both.

Figure 18:
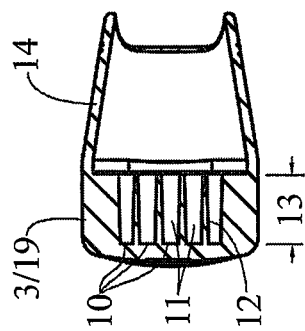
FIG. 18 is a cross section view 18-18 of the particular embodiment of the inventive recoil pad shown in FIG. 15.
Figure 19:
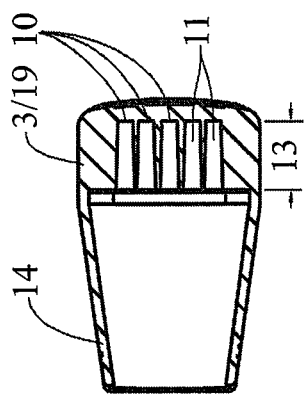
FIG. 19 is a cross section view 19-19 of the particular embodiment of the inventive recoil pad shown in FIG. 15.
Figure 20:
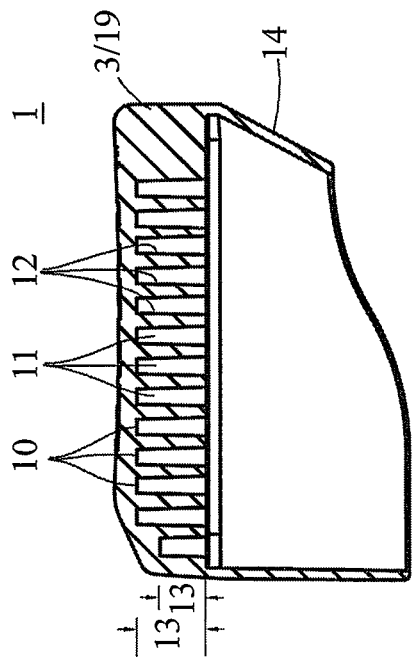
FIG. 20 is a cross section view 20-20 of the particular embodiment of the inventive recoil pad shown in FIG. 15.

Accordingly, even though a particular thermoplastic elastomer can have a fixed set of properties or the cured elastomer can have a fixed set of elastomer characteristics, it can be utilized to produce a numerous and wide variety of pads (3) in accordance with the invention, which allows the response of the pad (3) to absorb and delay the transfer of recoil energy from the stock to the shooter to be selectably varied based on the configuration, number, and depth of the core pins (16) (see for example FIG. 18 left side of cross section) extending into the inside volume of the mold (15) from the back surface (6) of the base (2), as above-described. Accordingly, as to certain portions of the pad (3) there may not be any pockets (10) and there may be no pocket volume (11) and the cured elastomer can be generally solid (see for example FIG. 18 right side of cross section), as to certain other portions of the pad (3) there may be numerous pockets (10) of the same or varied internal surface configuration (12) or pocket volume (11) which correspondingly alter the response of the corresponding portion of the pad (3) to absorb and delay the transfer of recoil energy from the stock to the shooter. The one piece base (2) and over-molded pad (3) can be removed from the mold and joined to the target stock.

As one example of a thermoplastic elastomer suitable for use with embodiments of the invention, the thermoplastic elastomer can have key characteristics or properties, as follows: specific gravity 1.06 (ASTM D792), melt mass-flow rate 37 g/10 minutes (200° C./5.0 kg) (ASTM D1238), molding shrinkage—flow 0.013 to 0.021 inches/inch (ASTM D955), tensile strength (100% strain, 73° F.) 100 psi (ASTM D412), tensile strength (break, 73° F.) 400 psi (ASTM D412), tensile strength, elongation (break, 73° F.) 640% (ASTM D412), tear strength 90.0 lbf/in (ASTM D624), compression set (73° F., 22.0 hr) 9.0% (ASTM D395B), durometer hardness 30 (ASTM D2240), apparent viscosity 392° F. 6.40 Pa·s, regrind 20%, elastomer temperature for molding in the range of about 320° F. to about 400° F., mold temperature about 60.0 to about 80.0° F.

Now referring primarily to FIGS. 8-14, which show a grindable embodiment of the inventive recoil pad (1). The grindable embodiment of the inventive recoil pad (1) can be made and used in substantially the same manner as above-described for the pre-fit embodiment of the inventive recoil pad (1) using a base (2) (see the examples FIGS. 8-13), substantially as above-described received within a mold (15) (see the example of FIG. 14) substantially as above described, which allows production of a plurality of embodiments of the pad (3) using one mold to vary the internal recoil pad structure to produce a wide variety of embodiments of the recoil pad (1), each of which can have correspondingly varied recoil pad characteristics of the pad (3) to absorb and delay the transfer of recoil energy from the stock to the shooter.

However, the base (2) and the pad (3) of the grindable embodiment can have a perimeter configuration which can be greater than the perimeter configuration of the target stock to which it joins. Accordingly, after joining the recoil pad (1) to the target stock, the target stock and the recoil pad (1) can be ground or abraded as a integral unit to bring the surfaces of the target stock and the side (7) of the base (2) flush with a corresponding amount of the pad (3) removed to establish the final configuration of the externals surface of the pad (3).

Figure 21:
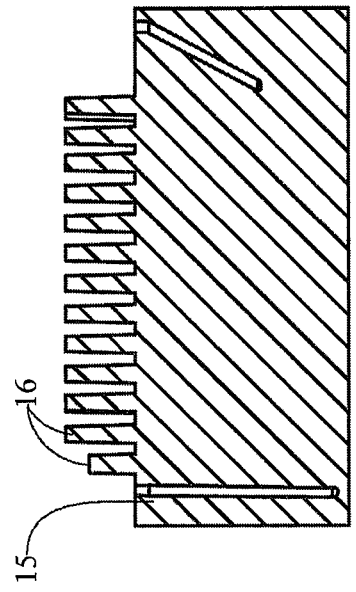
FIG. 21 is a cross section view of a mold used in the production of a plurality of embodiments of the inventive recoil pad of FIGS. 15-20.

Now referring primarily to FIGS. 15-21, which show a slip-on embodiment of the inventive recoil pad (1). The slip-on embodiment of the inventive recoil pad (1) includes the pad (3) which can be made by substantially the same method as above described. Typically, the slip-on embodiment will not include a base (3); however, the base (3) may be included as above described. The mold (15) (as shown in the example of FIG. 21) can be configured to provide a plurality of core pins (16) as above described to provide selectably varied number, location, configuration and depth of a plurality of pockets (10) to correspondingly provide the above described plurality of pocket volumes (11) within the entirety or a portion of the inventive recoil pad (1) to correspondingly alter the recoil pad characteristics between embodiments and the response of the corresponding portion of the pad (3) to absorb and delay the transfer of recoil energy from the stock to the shooter.

Embodiments of the slip-on recoil pad (1) can further provide a flexible sleeve (14) which can be configured to insertingly receive a portion of the target stock to engage the pad (3). While the flexible sleeve (14) can be molded as one piece with the pad (3); the invention is not so limited, and the pad (3) and the flexible sleeve (14) can be produced as separate joinable pieces. The pad (3) and flexible sleeve (14) can be produced in incrementally lesser or greater dimensions to fit to a numerous and varied target stocks. Understandably, the flexible sleeve (14) can be sufficiently resiliently flexible to allow the flexible sleeve (14) to be stretchably fitted to differently configured target stocks of similar dimension.

As can be easily understood from the foregoing, the basic concepts of the present invention may be embodied in a variety of ways. The invention involves numerous and varied embodiments of an inventive recoil pad and methods of making recoil pads including the best mode of the invention.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "pad" should be understood to encompass disclosure of the act of "padding"—whether explicitly discussed or not—and, conversely, were there effectively disclosure of the act of "padding", such a disclosure should be understood to encompass disclosure of a "pad" and even a "means for padding." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the recoil pads herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A method of producing a recoil pad for a weapon, comprising:
    a) obtaining a base having a plurality of aperture elements which communicate between a front surface and a back surface;
    b) obtaining a mold having within variably adjustable one or more core pins located to pass through a corresponding one or more of said plurality of aperture elements;
    c) variably adjusting said one or more core pins to correspondingly variably adjust one or more core pin characteristics within said mold;
    d) locating said base of said recoil pad in said mold by passing said one or more core pins through a corresponding one or more of said at least one of said plurality of aperture elements; and
    e) curing an amount of elastomer within said mold, said amount of elastomer overmolded to said back surface of said base to provide a pad for said recoil pad, said pad having within at least one pocket having one or more pocket characteristics generated by said one or more core pin characteristics variably adjusted within said mold.

2. The method of producing a recoil pad for a weapon of claim 1, further comprising adjusting numerosity of said one or more core pins within said mold which pass through a corresponding numerosity of said plurality of aperture elements in said base.

3. The method of producing a recoil pad for a weapon of claim 2, further comprising adjusting location of said one or more core pins within said mold which correspondingly pass through a corresponding one or more of said plurality of aperture elements correspondingly located in said base.

4. The method of producing a recoil pad for a weapon of claim 3, further comprising adjusting said one or more core pins within said mold to produce a pattern of core pins, said pattern of core pins passing through a corresponding said pattern of said plurality of aperture elements in said base.

5. The method of producing a recoil pad for a weapon of claim 4, further comprising adjusting height of said one or more core pins in said mold in relation to said back surface of said base.

6. The method of producing a recoil pad for a weapon of claim 5, further comprising generating a difference in height between at least two core pins within said mold.

7. The method of producing a recoil pad for a weapon of claim 6, further comprising adjusting cross sectional area of said one or more core pins within said mold.

8. The method of producing a recoil pad for a weapon of claim 7, further comprising generating a difference in cross sectional area between said at least two core pins within said mold.

9. The method of producing a recoil pad for a weapon of claim 1, further comprising adjusting composition of said amount of elastomer cured within said mold.

10. A method of producing a recoil pad for a weapon, comprising:
    a) providing a plurality of bases each having a plurality of apertures communicating between a front surface and a back surface, said plurality of apertures having a configuration substantially similar between said plurality of bases; and
    b) overmolding said plurality of bases with a corresponding plurality of pads serially in one mold cavity, each pad having within a plurality of pockets, each of said plurality of pockets having a different combination of one or more pocket characteristics based upon variable adjustment of core pin characteristics of a corresponding plurality of core pins located within said plurality of apertures of each of said plurality of said bases during overmolding with said corresponding plurality of pads.

* * * * *